US005241525A

United States Patent [19]

Taylor

[11] Patent Number: 5,241,525

[45] Date of Patent: Aug. 31, 1993

[54] DIGITAL OPTICAL DISC ENCODER SYSTEM

[75] Inventor: Thomas N. Taylor, Rochester, N.Y.

[73] Assignee: Xerox Corporation, Stamford, Conn.

[21] Appl. No.: 769,290

[22] Filed: Oct. 1, 1991

[51] Int. Cl.$^5$ ........................ G01D 5/26; G01D 15/14; G11B 7/007

[52] U.S. Cl. ........................................ 369/70; 346/137; 346/1.1; 431/13

[58] Field of Search ............................ 369/70; 341/13; 346/1.1, 136, 137, 75

[56] References Cited

U.S. PATENT DOCUMENTS

| | | | |
|---|---|---|---|
| 3,949,856 | 4/1976 | Ulber et al. | 400/579 |
| 3,987,492 | 10/1976 | Kraus et al. | 346/75 |
| 4,366,564 | 12/1982 | de Haan et al. | 369/48 |
| 4,445,128 | 4/1984 | Dolan et al. | 346/160 |
| 4,530,073 | 7/1985 | Higashihara et al. | 369/50 |
| 4,544,956 | 10/1985 | Shimizu | 358/296 |
| 4,574,291 | 3/1986 | Wimmer | 346/75 |
| 4,584,047 | 4/1986 | Vanderpool et al. | 156/361 |
| 4,733,069 | 3/1988 | Narutaki | 341/13 |
| 4,843,338 | 6/1989 | Rasmussen et al. | 346/136 |
| 4,956,648 | 9/1990 | Hongo | 346/1.1 |
| 4,978,971 | 12/1990 | Goetz et al. | 346/1.1 |

FOREIGN PATENT DOCUMENTS 2136733 9/1984 United Kingdom .

OTHER PUBLICATIONS

Electronic Engineering Times, May 20, 1991, page 1, "Sony Sounds Off About U.S. Mini Disc System", Junko Yoshida and page 94, "Sony Breaks On Throughout To the Other Side", Richard Doherty.

Electronics Engineers' Handbook, 3rd Edition, McGraw-Hill Book Co., pp. 19-89 to 19-24.

*Primary Examiner*—John S. Heyman

*Attorney, Agent, or Firm*—Oliff & Berridge

[57] ABSTRACT

An encoder system for providing a large number of actual positional control pulses per revolution utilizes an optical digital disc. The disc is driven by the work piece transport system. A playback unit similar in construction to audio disc players can be used. The positional control information is recorded on the disc as the disc is being driven by the transport system with which the disc is to be associated. Mechanical anomalies of the drive system are compensated for in the recording process. The accuracy of the positional information is improved. The system is especially useful for high resolution ink jet printing system.

18 Claims, 4 Drawing Sheets

DIGITAL OPTICAL DISC ENCODER SYSTEM

BACKGROUND OF THE INVENTION

1. Field of the Invention

This invention relates to position transducers and rotary motion encoders and methods for encoding machine control information for equipment employing a workpiece transport system. The invention has particular utility for pulse train encoders for providing positional output control signals for equipment such as ink jet printers.

2. Description of Related Art

With the development of equipment incorporating multiple electrically controlled elements, for example color ink jet printers, it has become necessary to supply ever increasing amounts of information to control such elements. For example, in a typical ink jet printer, it is necessary to provide on the order of 15,000 to 30,000 control pulses for each inch of travel of the printing medium. Ink jet printing systems, are very sensitive to displacement error of the transport system. Most systems operate by sensing displacement and firing ink jets when the correct position is reached. This position is usually sensed with an encoder. Errors in the displacement signal from the encoder can create undesirable patterns or loss of resolution in the printing, especially in quarter tone and other sensitive printing tones. Such errors can arise from limitations in encoder resolution and eccentricities in the bearings and shafts of the encoder and the transport system.

Motion encoders are devices which produce an electronic signal whose frequency is proportional to the angular velocity of a member being measured (e.g., a shaft) or which produce control signals to indicate positional information. Conventional encoders employ, for example, a very accurate optical disk. The disk can include a series of slots along its circumference or alternating transparent and opaque segments along its circumference which, when conveyed past a light beam, break the light beam and thereby create a pulse as the optical disc rotates. The frequency of the pulse varies as the speed of rotation of the disk varies or positional information is given as the disk rotates. However, optical disks are expensive to manufacture accurately. The alignment specifications required to achieve desired accuracy increases costs significantly and thus prohibit application in many cases. While the accuracy specification of an optical encoder may be 0.25 minutes of arc, even with extreme care, this accuracy can be achieved in practice only with great care in alignment. The expected accuracy achievable with optical encoders available at acceptable cost is about 1-2 minutes of arc. Thus, such optical encoders are limited with respect to the number of control pulses per revolution which can be recorded on them and, typically, commercially available optical encoders of acceptable size cannot provide more then about 20,000 actual pulses per revolution of the encoder disk. To achieve a greater number of control pulses from optical disks requires electronic enhancement techniques which provide virtual pulses from the actual pulse information recorded on the disk. Such enhanced optical encoders are costly and are likely to introduce positional error.

Inductive-type rotary motion encoders employ an induction principle to create pulses as a rotor is rotated. The principle advantage of inductive type rotary encoders is their tolerance to mechanical alignment. The influence of miscentering and tilt are greatly reduced because the rotor sums the contributions from individual stator coils located around the perimeter thereof. However, inductive type encoders have about the same accuracy and actual pulse number limitations as the previously described optical encoders.

Similarly, widely available magnetic disks, such as those used for personal computers, have been considered but do not provide the amount of position data per revolution of the disk required for equipment such as ink jet printers. To obtain the desired number of control pulses requires a step-up drive to rotate the disk at a multiple of the transport drum or encoder roller rotation. Such step-up systems introduce inaccuracies and this compromise the control resolution available. The use of larger disks to increase the number of control pulses per revolution is undesirable, as such disks (either of the optical or the magnetic type) would be non-standard size (and therefore expensive) and would introduce problems stemming from the inertia of the larger disk. Moreover, magnetic encoding can, over time, become compromised by the effects of static discharge and power interruptions to the equipment.

A further disadvantage of the above-described systems is that the control disks are encoded in separate recording equipment. When placed in service, irregularities resulting from mechanical anomalies in the transport systems driving the encoder can result in timing faults to the controlled element, for example an ink jet printing head. The faults can result in reduction in the quality of the printed image and in recurring, undesirable patterns in the printing.

SUMMARY OF THE INVENTION

It is an object of the invention to achieve accurate high resolution control of machine elements at low cost.

It is a further object of the invention to provide improved encoders for ink jet printing systems.

It is a further object of the invention to achieve an encoder system that is compensated for mechanical and other anomalies in the system that drives the encoder.

These and other objects of the invention are achieved by use of an encoder employing an optical digital recording member. Control information is recorded on spiral tracks of an optical digital disc. Mechanical anomalies of a work piece transport system on which the encoder is mounted are recorded as part of the information on the optical disc. This is accomplished by recording the control information on the optical member while the optical member is being driven by the transport system on which the encoder is mounted.

DESCRIPTION OF THE PREFERRED EMBODIMENT

While the control apparatus and method of the invention has broad applicability to encoding systems usable in a wide variety of machines, it has particular applicability to the control of printers. The following description is in that context.

Figure 1:
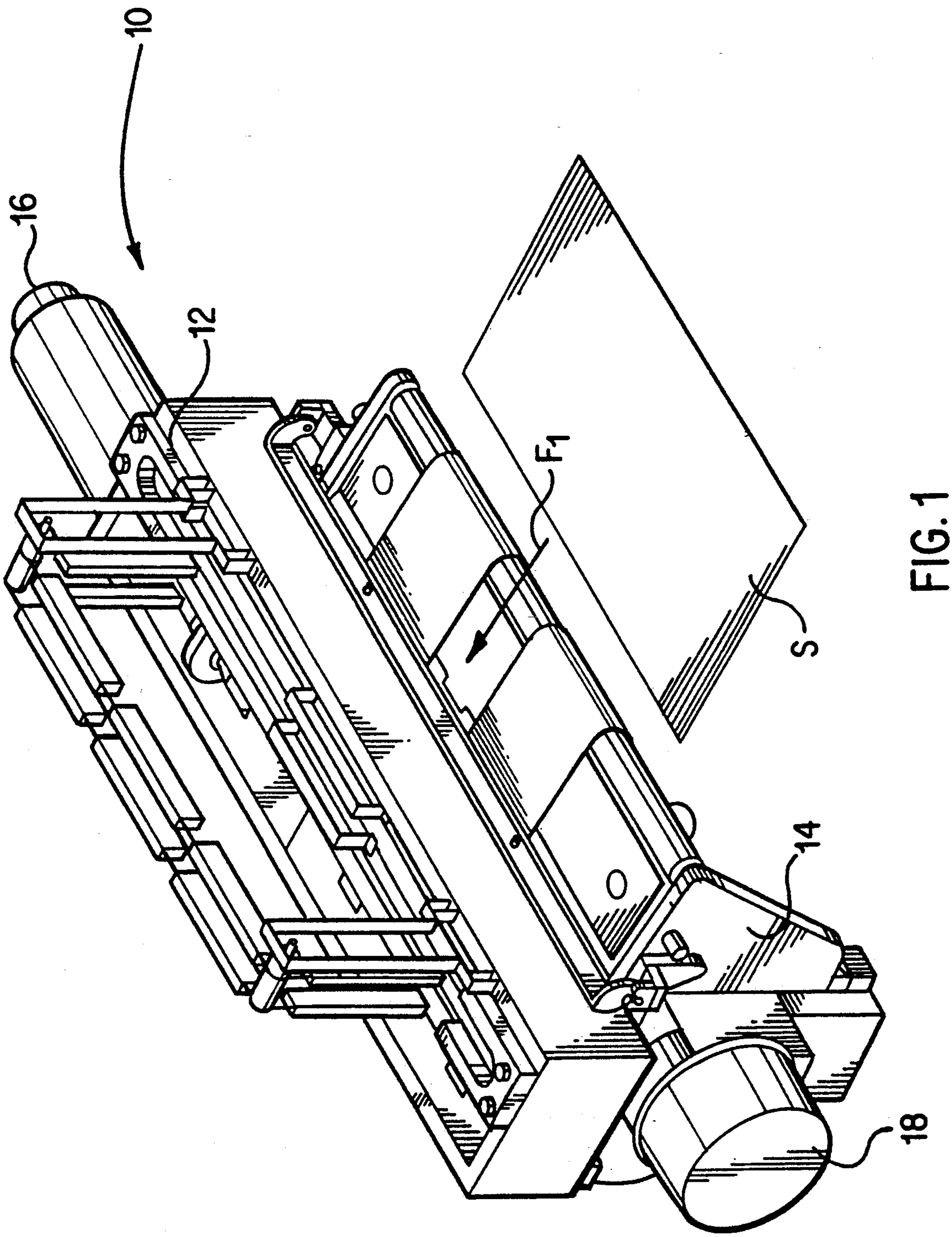
FIG. 1 is a perspective view of an ink jet printing station having a sheet transport system and incorporating an encoder in accordance with the invention.

FIG. 1 shows an ink jet printing station 10 which includes an ink jet print bar assembly 12. The ink jets of the print bar assembly can be of the thermal or drop on demand type. The construction of such jets is well known and therefore a detailed description of them is not necessary. The bar assembly may include a plurality of closely spaced jets or a traveling printhead for jetting ink onto a printing medium, such as paper sheet S. The successive printing position of the ink jet nozzles in the direction of travel of the sheet S are very closely spaced to attain good image resolution and the operation of the nozzles at each position is controlled by a separate electrical control signal controlling the timing of the firing of the ink jets. In the typical printing operation, it may be necessary to provide between 15,000 to 30,000 position control pulses from the encoder for each inch of travel of sheet S. To provide high definition printing and printing without recurring undesirable patterns requires very high positional accuracy. This is especially the case with color ink jet printing in which droplets of one color must be accurately deposited onto previously deposited droplets of another color to obtain a desired third color.

The sheet S is carried laterally in the direction of arrow $F_1$ beneath the print bar assembly 12 by a sheet transport system 14 (hereinafter described in more detail). A rotary electrical motor 16 drives the transport system 14 in a desired direction. A digital optical encoder 18 is mounted on and driven by the transport system 14. The encoder 18 provides control signals for controlling the ink jets in the print bar assembly 12 and may also provide control signals for controlling other operations of the printing station or other work stations of the equipment in which the printing station 10 is mounted.

Figure 2:
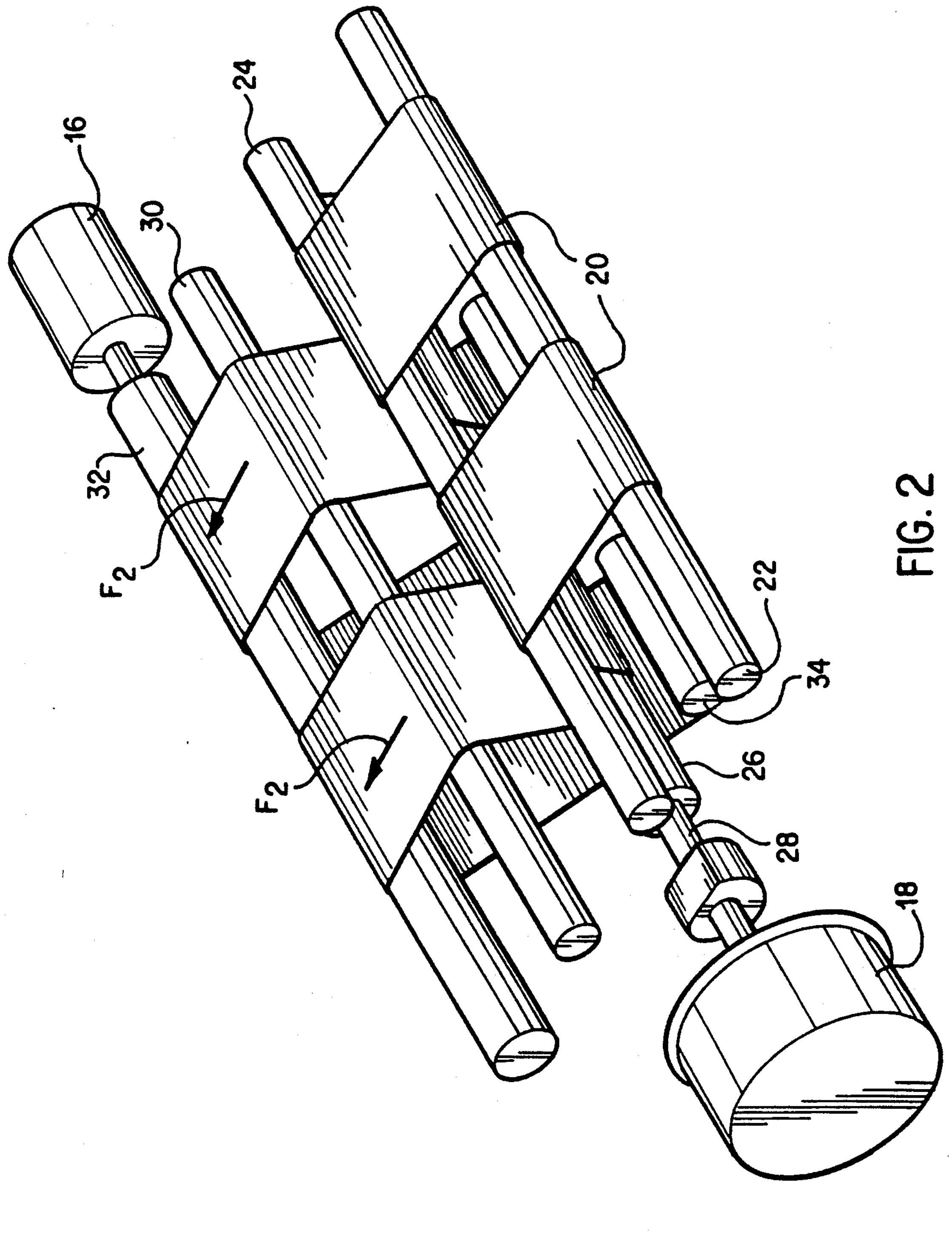
FIG. 2 is a schematic perspective view of the sheet transport system of the printing station shown in FIG. 1.

As shown in FIG. 2, the transport system includes a plurality of rotatable rollers on which one or more endless transport belts 20 are entrained. The belts 20 are entrained over freely rotatable incoming roll 22 and a first central support roll 24. The belts 20 are then diverted downwardly toward and pass in contact with the lower circumference of the encoder roller 26 and then pass over a second central support roller 30 to drive roller 32, which is driven by the motor 16. The belts 20 then pass back beneath the upper rollers to a lower roller 34 and return to the incoming roller 22. The rollers 22, 24, 30 and 32 are arranged so that the belts 20 form substantially flat portions for supporting the paper sheet S as it passes the print bar assembly 12. Typically a support plate (not shown) is provided in the region between rollers 24 and 30 to support sheet S as ink is jetted onto the sheet.

As can be readily seen, when motor 16 is actuated, the drive roll 32 rotates to cause the belts 20 to move in the direction of arrows $F_2$. Linear movement imparted to the belts 26 results in rotation of the rollers 22, 24, 26, 30 and 34.

As shown in FIG. 2, encoder roller 26 is connected by a shaft 28 to the encoder 18. Thus shaft 28 comprises a rotary mechanical input to the encoder 18. The encoder 18 comprises a means for storing control information and a reading mechanism for reading such information. In the preferred embodiment, the encoder 18 comprises a compact disc playback unit of the type used for audio compact disc players. Such units are commonly used in personal audio systems and are known and widely available. In these units, a replaceable, digitally encoded optical disc is rotated at a constant linear velocity. A laser read out system is moved radially with respect to the disc to read out digital information recorded on successive spiral tracks on the disc. Such compact disc playback units incorporate systems for controlling movement of the laser playback assembly and for insuring playback accuracy the digital information encoded on the disc. The recording and playback of optical digital discs involve known technologies and are described, for example in the Electronics Engineers' Handbook, 3rd Edition (1989) pp 19-89 to 19-94, published by McGraw-Hill, Inc. and incorporated herein by reference. Such systems are also disclosed, for example, in U.S. Pat. Nos. 4,366,564 and 4,530,073, which are incorporated herein by reference. Laser readable optical/magneto optical discs having rerecording capabilities are also known and could be utilized for purposes of this invention.

Figure 3:
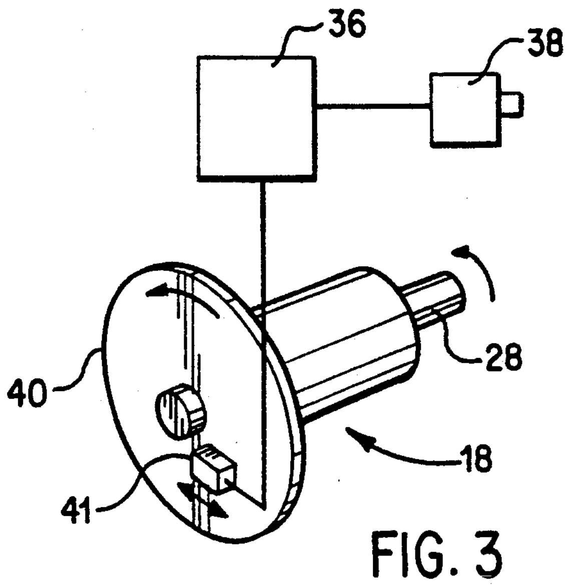
FIG. 3 is a schematic illustration of a control system for the printing station illustrated in FIG. 1.

To provide a suitable encoder in accordance with the invention, the conventional audio optical disk playback unit can be modified to remove the motor which normally drives the disc and, instead, utilize rotation of shaft 28 to rotate the digital disc 40 (FIG. 3). Thus the disc 40 is driven in a direct one-to-one relationship with the mechanical input to the encoder. The shaft 28 can be the roller shaft as shown in FIG. 2 or can comprise a central shaft which rotatably supports a transport drum. As the disc rotates, a readout or playback head 41 is moved radially to follow at least one spiral track 42 on which information is encoded. The output is a stream of output pulses which correspond to successive incremental positions of the sheet S during its transport.

Figure 4:
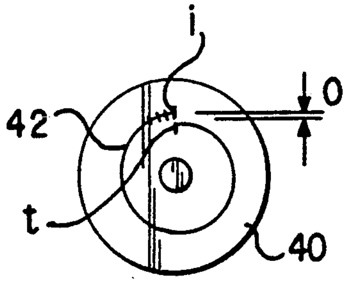
FIG. 4 is a schematic plan view of an optical digital disc used for providing control information.

As the sheet S is driven past the print bar assembly 12 by the transport system 14, encoder roller 26 is rotated, thereby rotating shaft 28 which effects rotation of the digital optical disc 40 (FIG. 4). The system is designed so that, during one complete cycle of the transport system 14, that is, the complete feeding cycle of one sheet S, the encoder roller 26 rotates n times. Typically n is a whole integer between about 5 to about 10 for belt transport systems, depending upon the relationship between the diameter of the encoder roller and the length of the transport belts. For drum systems, n is one when one sheet is fed for each rotation of the drum. The control information recorded on the track 42 can function as positional information to control, for example, the firing of ink jets in the print bar assembly 12.

As shown in FIG. 3, signals from the encoder 18 are provided to a control unit 36 which can comprise, for example, a microprocessor. The signals are read from the digital optical disc 40 by a laser read-out assembly 41, which is movable radially with respect to the disc. Control arrangements for moving the read-out assembly are used in digital disc players and such an arrangement is utilized in the present encoder. Therefore, no further details of such systems are necessary. The control unit 36 controls, for example, the movement and firing of a transversely movable ink jet printing head 38 or the firing of the plurality of fixed ink jets that are mounted in the print bar assembly 12. Because the digital optical disc 40 can store a higher number of control pulses for each revolution of the disc, the disc can be driven directly by parts of the sheet transport system and provide a higher number of control pulses. This avoids the need for any step up system to drive the disc.

Although the foregoing description is of a moving belt transport system, the optical encoder 18 is especially useful with drum transports. Drum transports require high resolution when used with ink jet printers. The digital optical encoder disc can be mounted for rotation with the drum to provide the number of control pulses for ink jet printers. For example, one revolution of the disc 40 can provide on the order of 255,000 control pulses, which, for a typical five inch diameter transport drum, is sufficient to provide positional control pulses for driving an ink jet system having a resolution of 600 dots per inch. Since the disc is fixed to rotate with the drum, very high positional accuracy is assured as each pulse corresponds to an actual discrete physical position of the drum.

As shown in FIG. 4, pulse information is recorded on laser disc 40 in spiral tracks 42 in the form of substantially uniformly spaced pits or magneto optical spots. An advantage of the system is that several 360° tracks of information can be recorded spirally on the disc. The gap between successive sheets can be utilized to provide the time necessary to move the laser read-out assembly 41 through the radial distance 0, from an ending point on an inner portion of the track to a beginning point on an outer portion of the track.

Preferably the number of spiral convolutions of track 42 exceeds by at least 1 the number of revolutions of the disc 40 needed to provide the greatest number of position signals required for one transport system cycle. This is desirable so that the reading operation can begin again simply by moving reader 41 radially to the outermost or first track and immediately being reading control pulses in preparation for the next sheet. This avoids the possibility of the reader 41 being positioned at a blank part of the disc when it is moved radially outwardly to begin a new reading cycle. Because only a small number of spiral convolutions on the disc are needed, only a small amount of radial movement of the reader 41 is needed, in comparison to its normal transverse for audio discs.

Figure 5:
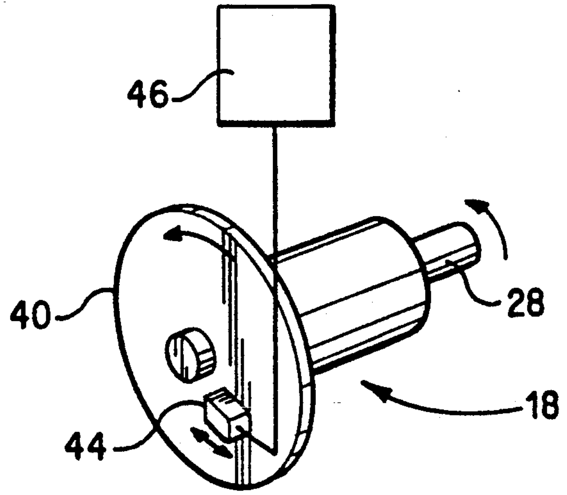
FIG. 5 is a schematic illustration of a recording system for recording timing information on an optical digital disc.

Another feature of the invention is that, during manufacture of the transport system, an optical digital disc 40 which is unique to the particular transport system, is made. The shaft 28 is utilized to drive the disc during recording, as shown in FIG. 5. The transport system, including shaft 28, is driven at its normal operational speed. The pulse information is recorded on the disc by a laser writing head 44 at a predetermined rate, representative of the desired resolution or timing frequency, by signals from a controllable frequency generator 46. Systems utilizing laser writing heads for forming pits on optical digital disks are known and commercially available. Such systems, as well as the above mentioned optical/magneto optical systems, can be adapted to utilize the transport drive to rotate the disc during the recording operation.

Figure 6:
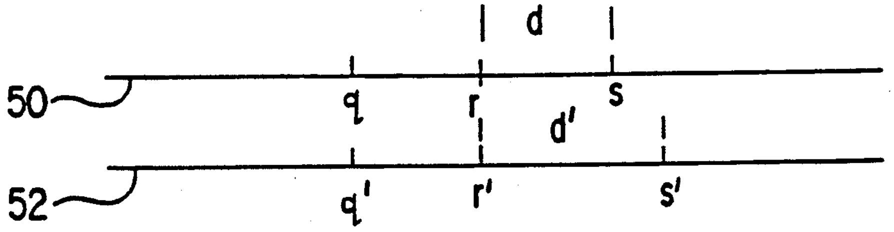
FIG. 6 is a schematic illustration of the recording of timing signals.

The improvement in the resolution of control information is illustrated schematically in FIG. 6. For purposes of simplification, the tracks 50 and 52 are shown as straight. In the upper track 50, a series of signals q, r and s are shown in idealized fashion; that is, uniformly spaced, as a result of a constant speed of rotation of the disc during recording of a fixed frequency signal. However, if the speed of disc 40 is irregular, the signals q', r' and s' of recorded track 52 are formed to reflect variations in speed of the disc. For example, if there is a local increase in the speed of the disc between the formation of signals r' and s', the distance d' will be greater than the idealized difference d, which would occur if the disc is rotated at a constant speed. Having the control signal generated at s' ensures that the controlled event, for example, an ink jet firing, occurs at the proper point on the sheet S, irrespective of the timing anomaly between r' and s'.

An advantage of this invention is that a high number of control pulses can be provided for each revolution of the digital optical disc, allowing the disc to be driven directly by and at the same speed as the transport system. A further advantage of this process is that mechanical anomalies resulting from eccentricities in the rollers or in bearings mounting the rollers, and other mechanical irregularities, will result in those anomalies being imparted to the disc during rotation. This results in the timing information encoded on the disc being recorded in a manner that inherently includes and compensates for such anomalies. Thus the control signals provided by the encoder 18 more accurately reflect the positional information of the transport system 14, thereby improving printing quality for ink jet printers. Further, such information can be utilized by field personnel to assess the condition of the transport mechanism, for example, as would result from bearing or roller wear.

What is claimed is:

1. Printing apparatus comprising:

a printer for printing on a printing medium;

a transport system for moving the printing medium with respect to the printing means;

an encoder associated with the transport system for providing control signals indicative of the position of the transport means; and a controller for receiving the control signals from the encoder and controlling operation of the printer;

wherein the encoder comprises a digital optical disc, said digital optical disc having control information recorded thereon in a track comprising spiral convolutions, and a reading element radially movable for reading said information from the spiral convolutions and providing control signals corresponding to said information.

2. Apparatus as in claim 1, wherein the information on the digital optical disc includes information specific to the characteristics of the transport means.

3. Apparatus as in claim 1, wherein the transport system comprises a rotatable element and the digital optical disc is driven by rotation of the rotatable element.

4. Apparatus as in claim 3, wherein the disc is driven directly by the rotatable element.

5. Apparatus as in claim 3, wherein the transport system further comprises a movable belt and the rotatable element comprises a roller rotated by the movable belt.

6. Apparatus as in claim 3, wherein the rotatable element is a drum and the digital optical disc is mounted to rotate with the drum.

7. Apparatus as in claim 1, wherein the printer comprises an ink jet printer.

8. A method for controlling a printer having a printing means, a control means utilizing control signals to control the printing means, a movable transport means for moving a printing medium with respect to the printing means, and control signal means for providing the control signals in accordance with positioning of the transport means, comprising the steps of:

associating a recording element for recording the control signals with the transport means;

activating the transport means in a printing medium movement cycle to drive the recording element; and recording control information for the printing means on the recording element while the recording element is driven by the transport means during said cycle.

9. The method of claim 8, wherein the recording element is a digital optical disc and the step of recording information on the disc comprises optically encoding information on the disc for providing said control signals.

10. The method of claim 9, wherein the step of recording information on the disc comprises providing a signal of predetermined frequency for recording on the disc.

11. A machine control system comprising:

a controlled element;

a workpiece transport system for moving a workpiece in a path adjacent the controlled element;

a control information storing element movable in response to movement of the workpiece transport system for providing information to control said controlled element, said storing element comprising a digital optical disc, said digital optical-disc having control information recorded thereon in a track comprising spiral convolutions; and a reading element for optically reading information encoded on the spiral convolutions of the disc and providing control signals for the controlled element.

12. Apparatus as in claim 11, wherein the transport system comprises a rotatable member and the rotatable member rotates said disc.

13. Apparatus as in claim 12, wherein the rotatable member comprises a roller and the disc is mounted for rotation with the roller.

14. Apparatus as in claim 12, wherein the rotatable member is a drum and the disc is mounted for rotation with the drum.

15. Apparatus as in claim 11, wherein the means for reading information on the disc comprises a laser for projecting light toward the disc and detecting means for detecting light reflected from the disc.

16. A method for initializing a control system for a controllable machine element having a cyclable workpiece transport system for transporting a workpiece in a path of travel with respect to said machine element comprising the steps of:

associating an optical recording element for recording control information with the workpiece transport system;

driving the recording element by cycling the transport system through at least one workpiece transport cycle; and recording control information for controlling the machine element on the optical recording element as the transport system is cycled.

17. The method as in claim 16, wherein the optical recording element is a digital optical disc and the disc is rotated as the transport means is cycled.

18. A method as in claim 17, wherein the step of recording control information comprises providing a signal of predetermined frequency for recording on the disc as the disc is rotated by the transport system.

* * * * *